W. T. PUTNAM.
LAWN EDGE TRIMMER AND GUTTER FORMER.
APPLICATION FILED APR. 28, 1913.
1,101,713.
Patented June 30, 1914.
2 SHEETS—SHEET 1.
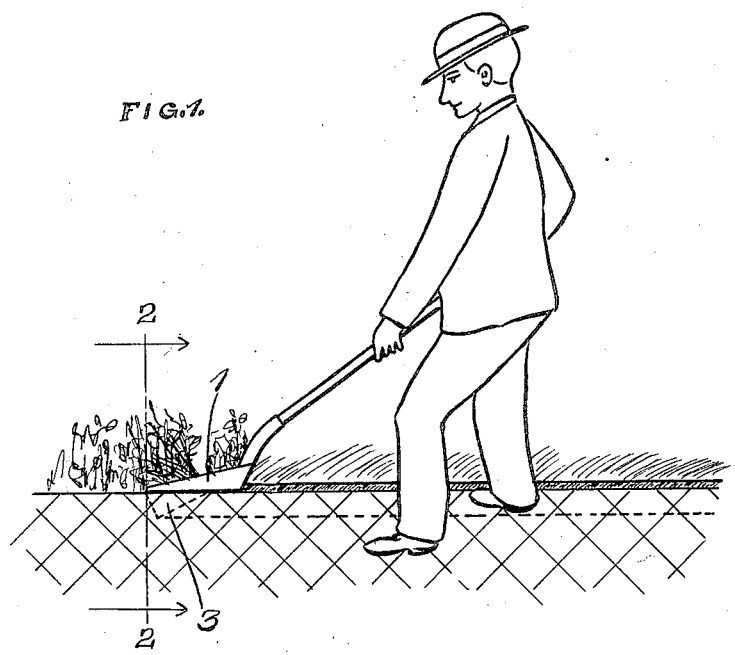
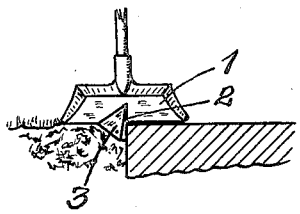
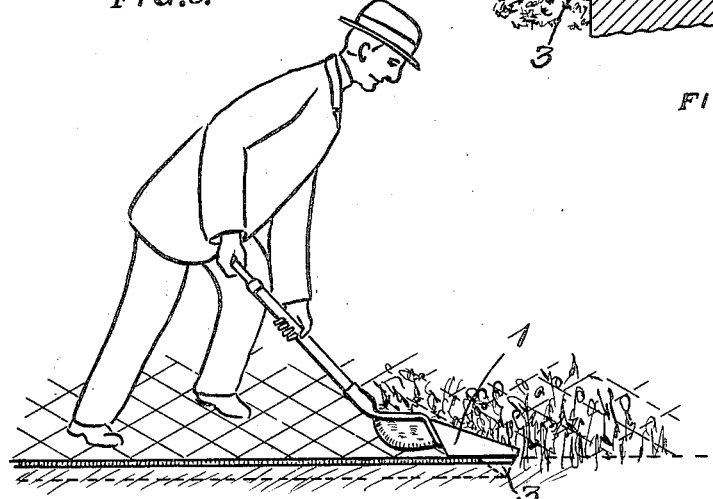
WITNESSES
INVENTOR W. T. PUTNAM.
LAWN EDGE TRIMMER AND GUTTER FORMER.
APPLICATION FILED APR. 28, 1913.
1,101,713.
Patented June 30, 1914.
2 SHEETS—SHEET 2.
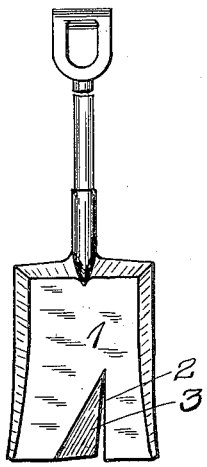
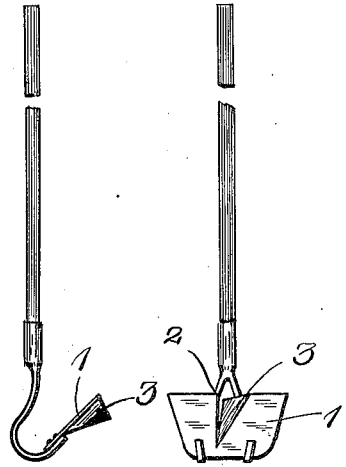
FIG. 4.　　FIG. 5.　　FIG. 6.　　FIG. 7.
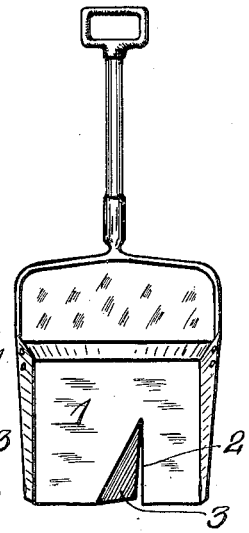
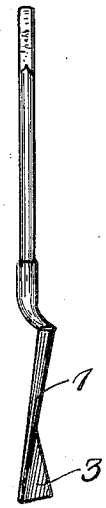
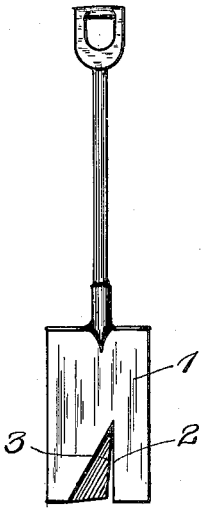
FIG. 8.　　FIG. 9.　　FIG. 10.　　FIG. 11.
WITNESSES
INVENTOR
William T. Putnam

UNITED STATES PATENT OFFICE.

WILLIAM T. PUTNAM, OF DANVILLE, ILLINOIS.

LAWN-EDGE TRIMMER AND GUTTER-FORMER.

1,101,713.  Specification of Letters Patent.  Patented June 30, 1914.

Application filed April 28, 1913. Serial No. 764,248.

*To all whom it may concern:*

Be it known that I, WILLIAM T. PUTNAM, a citizen of the United States, and a resident of Danville, county of Vermilion, State of Illinois, have invented certain new and useful Improvements in Lawn-Edge Trimmers and Gutter-Formers, of which the following is a specification.

This invention relates to improvements in lawn edge trimmers and gutter formers.

The object of the invention is to provide a simple and efficient tool which will simultaneously trim grass and form a kerf around the edges of flower beds, walks and the like thereby producing a draining gutter in the earth along the side edges.

In the accompanying drawings: Figure 1 represents a side elevation of a side walk and tool constructed in accordance with this invention shown in operation and in connection with said side walk; Fig. 2 is a transverse section taken on line 2—2 of Fig. 1; Fig. 3 is a view similar to Fig. 1 showing another form of the invention; Fig. 4 is a side elevation of a shovel constructed in accordance with this invention; Fig. 5 is a front elevation thereof; Fig. 6 is a side elevation of a weeding hoe equipped with this invention; Fig. 7 is a front elevation thereof; Fig. 8 is a side elevation of another form of shovel constructed in accordance with this invention; Fig. 9 is a front elevation thereof; Fig. 10 is a side elevation of a spade embodying this invention; Fig. 11 is a front elevation thereof.

Any tool having a suitable blade may be equipped with this invention, shovels, spades and weeding hoes being here shown.

The invention consists in slitting a tool blade 1 longitudinally from the front edge or point thereof inwardly as shown at 2 and forming a lip 3 at one side of the slit 2 by pressing down the metal at the edge of the slit preferably by means of the same die which forms the cut or slit. The slit 2 may be of any desired length and the lip 3 of any desired width. As shown this lip 3 is formed by bending the metal at one side of the slit on an oblique line from the inner end of the slit 2 to the front edge of the tool forming a substantially triangular cutter adapted when its edges are sharpened to form a V-shaped gutter of any desired depth or width according to the size of the lip whereby an ornamental appearance to the lawn on which it is used is produced and a drain for the side walks and flower beds thereof provided. This cutting lip or gutter former 3 while shown here in Figs. 6 and 7 on the blade of a hoe, is preferably used on shovel or spade blades as these may be readily pushed along in advance of the operator the sharpened edges of said lip shearing the grass and simultaneously scooping out the earth in advance of the tool to form a gutter.

I claim as my invention:

1. A lawn edge trimmer and gutter former comprising a blade having a handle at one end and a sharpened edge at the other end, said blade having a slit extending longitudinally inward from the sharpened front edge thereof, the metal at one edge of said slit being bent downwardly on an oblique line to form a triangular cutting lip.

2. A lawn edge trimmer and gutter former comprising a handle and a blade carried thereby and having a straight cutting edge, said blade having a slit extending longitudinally inward from its sharpened front edge and disposed adjacent the central axis of the blade, the metal at the edge of said slit nearer the central axis of the blade being bent downwardly on a line extending obliquely from the inner end of said slit to a point spaced from the adjacent side edge of the blade to form a triangular cutting lip.

In testimony whereof I have hereunto set my hand in presence of two subscribing witnesses.

WILLIAM T. PUTNAM.

Witnesses:
 FRED W. PUTNAM,
 WILL E. PUTNAM.

Copies of this patent may be obtained for five cents each, by addressing the "Commissioner of Patents, Washington, D. C."